US011870182B2

(12) United States Patent
Jaeger et al.

(10) Patent No.: US 11,870,182 B2
(45) Date of Patent: Jan. 9, 2024

(54) PLUG CONNECTOR WITH 360° PLUGGABILITY

(71) Applicant: HIRSCHMANN AUTOMOTIVE GMBH, Rankweil/Brederis (AT)

(72) Inventors: Guenter Jaeger, Goetzis (AT); Marco Gabriel, Dornbirn (AT)

(73) Assignee: HIRSCHMANN AUTOMOTIVE GMBH, Rankweil/Brederis (AT)

( * ) Notice: Subject to any disclaimer, the term of this patent is extended or adjusted under 35 U.S.C. 154(b) by 347 days.

(21) Appl. No.: 17/424,788

(22) PCT Filed: Feb. 15, 2019

(86) PCT No.: PCT/EP2019/053839
§ 371 (c)(1),
(2) Date: Jul. 21, 2021

(87) PCT Pub. No.: WO2020/164736
PCT Pub. Date: Aug. 20, 2020

(65) Prior Publication Data

US 2022/0069520 A1 Mar. 3, 2022

(51) Int. Cl.

| | |
|---|---|
| ***H01R 13/627*** | (2006.01) |
| ***H01R 13/502*** | (2006.01) |
| ***H01R 13/631*** | (2006.01) |
| ***H01R 13/64*** | (2006.01) |

(52) U.S. Cl.
CPC ....... *H01R 13/6273* (2013.01); *H01R 13/502* (2013.01); *H01R 13/6315* (2013.01); *H01R 13/64* (2013.01)

(58) Field of Classification Search
CPC .............. H01R 13/6273; H01R 13/502; H01R 13/6315; H01R 13/64; H01R 13/629
See application file for complete search history.

(56) References Cited

U.S. PATENT DOCUMENTS

| | | | | |
|---|---|---|---|---|
| 10,005,522 | B2 * | 6/2018 | Taylor | E02D 27/52 |
| 2007/0178717 | A1 | 8/2007 | Harshman | |
| 2010/0178789 | A1 | 7/2010 | Ohmori | |
| 2010/0240242 | A1 | 9/2010 | Pfaffenbach | |
| 2014/0357114 | A1 | 12/2014 | Pankau | |

FOREIGN PATENT DOCUMENTS

| | | | | |
|---|---|---|---|---|
| EP | 2822106 | A | 1/2015 | |
| EP | 2822106 | A1 * | 1/2015 | H01R 13/629 |

* cited by examiner

*Primary Examiner* — Briggitte R. Hammond
(74) *Attorney, Agent, or Firm* — Andrew Wilford

(57) ABSTRACT

A connector assembly (1) comprising a main connector (2) with a contact support (6), and a mating connector (3) that can be mated with the main connector (2), having a contact support (7), wherein the mating connector (3), in the plug-in region, is formed with a chamfer (10) that corresponds to the shape of the main connector (2) such that, during the mating process, the main connector (2) is inserted into the mating connector (3) in a predefined position, wherein the main connector (2) comprises two axially extending springs (8), arranged in opposition in the plug-in direction, and the mating connector (3) comprises two opposing slots (9), or vice versa, wherein a spring (8) corresponds to its respective slot (9), characterized in that the two springs (8) have different lengths.

8 Claims, 17 Drawing Sheets

PLUG CONNECTOR WITH 360° PLUGGABILITY

CROSS REFERENCE TO RELATED APPLICATIONS

Figure 1:
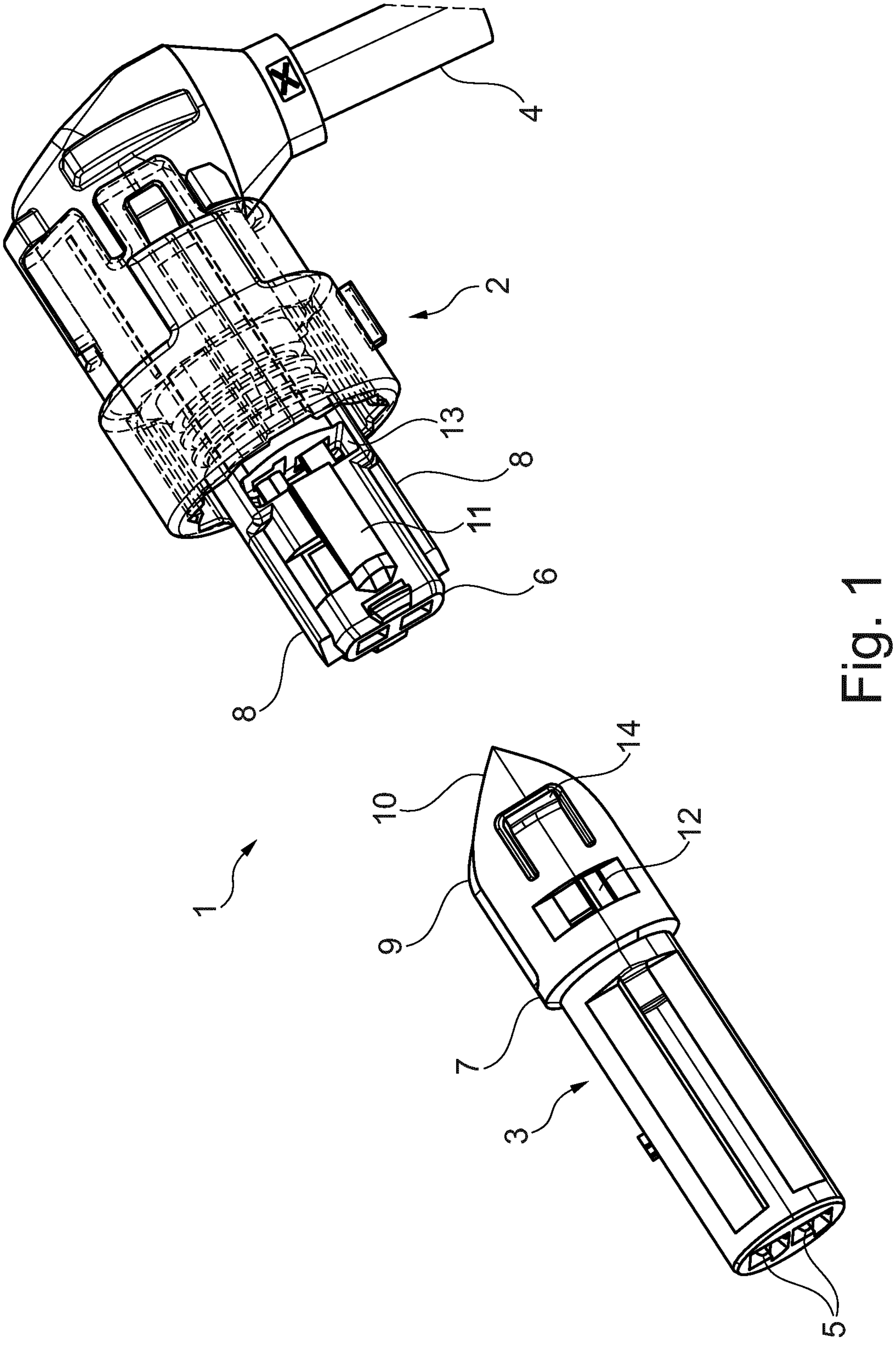
Figure 2:
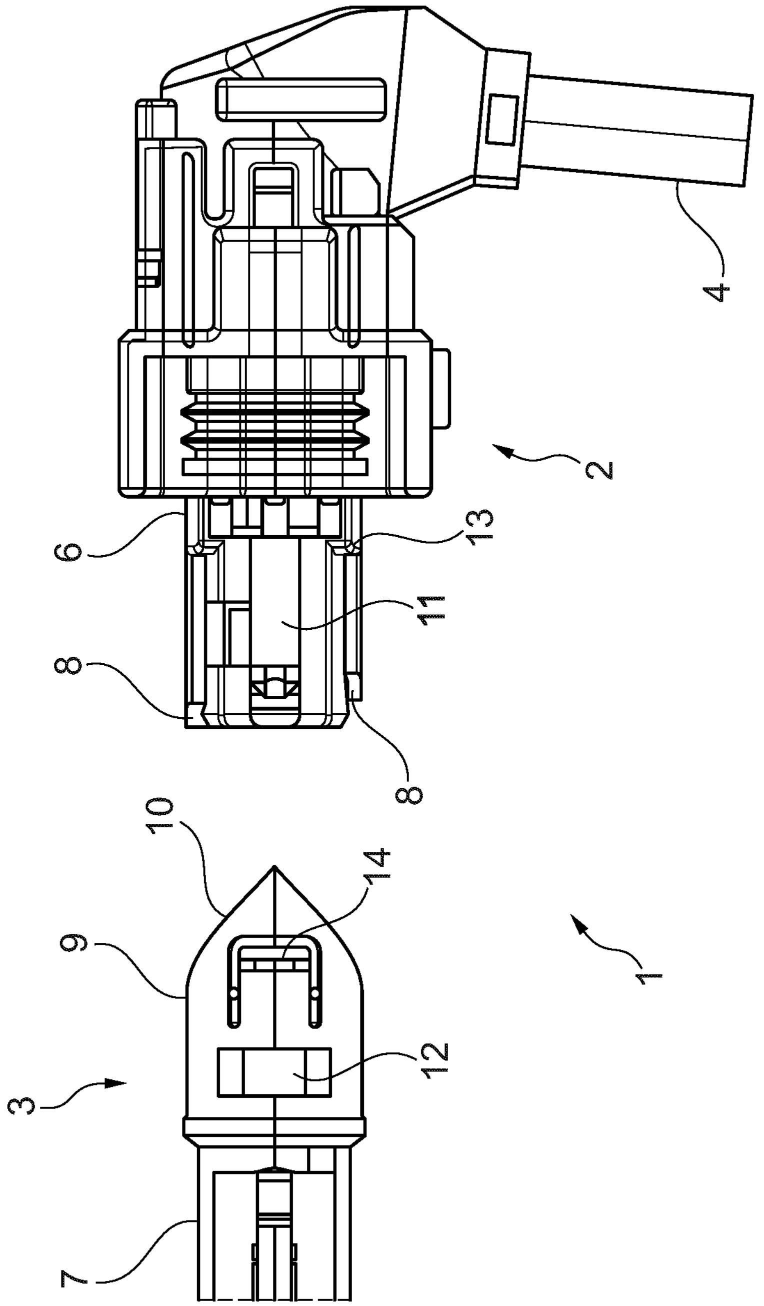
Figure 3:
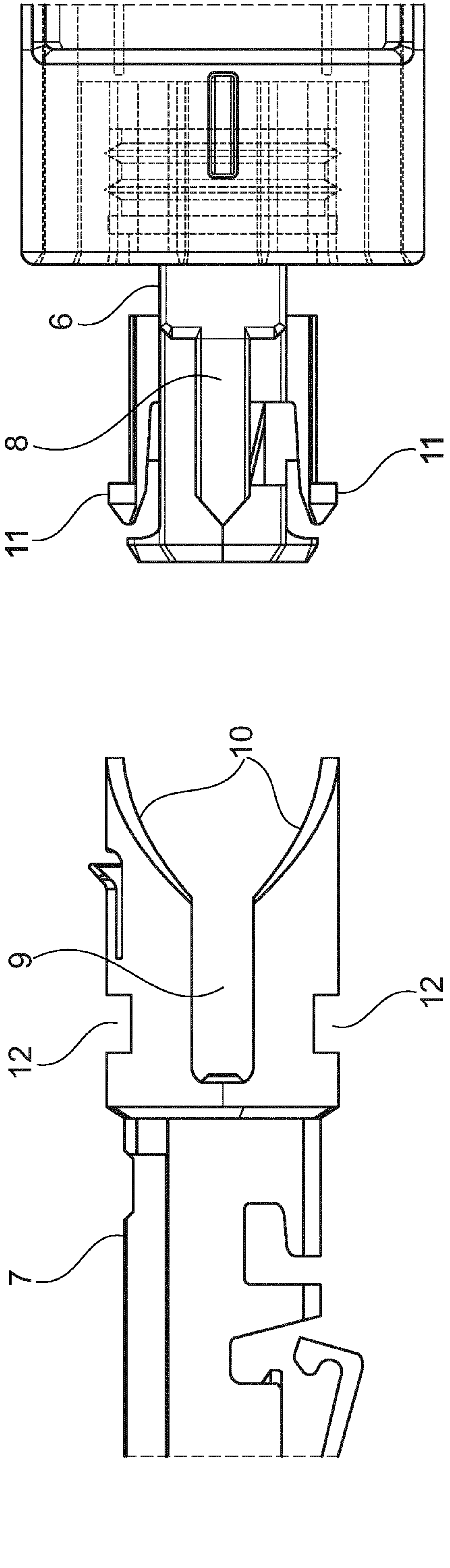
Figure 4:
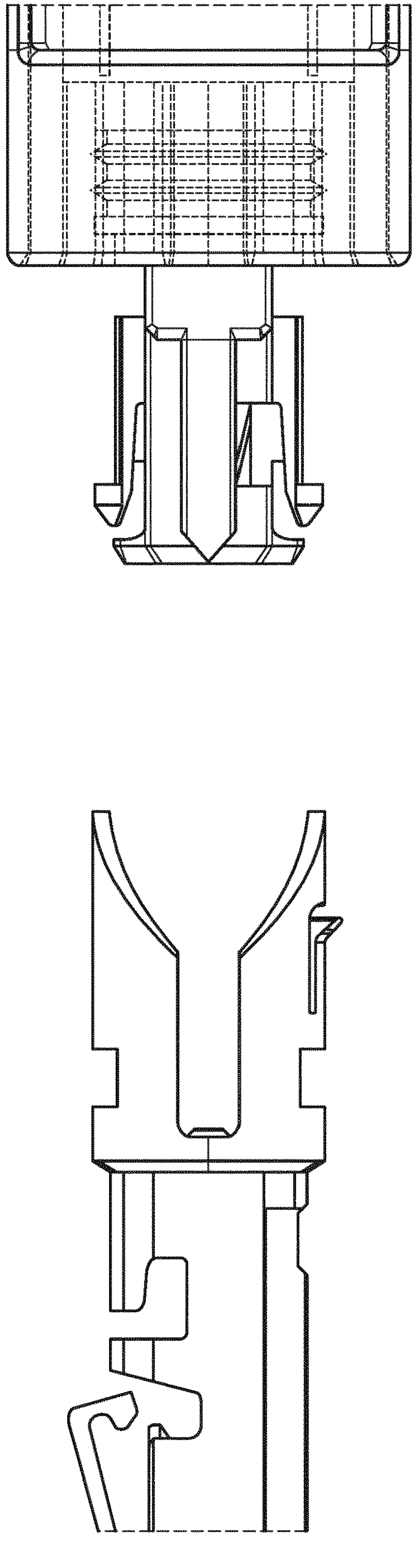

This application is the US-national stage of PCT application PCT/EP2019/053839 filed 15 Feb. 2019 and claiming the priority of PCT patent application PCT/EP2019/053839 itself filed 15 Feb. 2019.

The invention relates to a connector assembly, comprising a main connector with a contact support, and a mating connector that can be mated with the main connector, having a contact support, wherein the mating connector is formed in a plug-in region with a chamfer that corresponds to the shape of the main connector such that, during the mating process, the main connector is inserted into the mating connector in a predefined position, wherein the main connector comprises two axially extending springs, arranged in opposition in the plug-in direction, and the mating connector comprises two opposing slots, or vice versa, wherein a spring corresponds to its respective slot, according to the characteristics of the introductory clause of patent claim 1.

Connector assemblies of this type, having a main connector and a mating connector that can be mated and that, for example, are respectively located at the end of a cable or at a device input, are known in principle. The main connector comprises at least one contact partner that, during the mating process, engages with the respective contact partner of the mating connector, thereby constituting an electrical connection. In the employment of connector assemblies of this type, in many cases, it is of no significance whether the main connector can be easily and simply inserted into the mating connector. Moreover, in many cases, the position assumed by the main connector and the mating connector further to the mating process is of no significance. In many cases, the cable outlet, i.e. the region in which the cable is brought out of the main connector or the mating connector (and that thus lies opposite the plug-in face of the main connector or the plug-in face of the mating connector), can also be arbitrary. In such cases, it is of no relevance how the shape of the main connector, at its plug-in face, and the shape of the plug-in face of the corresponding mating connector are configured.

In many cases, however, connector assemblies of this type are required to provide a facility for simple, rapid and uncomplicated mating, as frequently applies in the case of multi-pole connector assemblies. If, in this case, no measures are adopted for the mating process, it can occur that the main connector is not inserted into the mating connector in the correct position such that, for example, polarity reversals can occur. It can moreover arise that, on the grounds of the position of the contact partners in the main connector and the position of the respective contact partners in the mating connector, the correct orientation of the main connector in relation to the mating connector is not directly assumed that will permit the positionally correct mating thereof. If, in such a case, the correct position is located by the rotation of the main connector in relation to the mating connector, the mating process can be executed axially. In many cases, however, this rotation, which requires a number of attempts, is not desirable. In order to circumvent this problem, in practice, for example, latching connector assemblies are now known. In the latter, on the grounds of the shape of the main connector and the shape of the mating connector, a simple and positionally correct mating process is achieved. In some specific applications, however, this design is not desirable on the grounds that, in latching connector assemblies of this type, only two contact partners are present and, considered in the plug-in direction, these are arranged axially one behind another. If more than two contact partners are present, or if the contact partners are arranged in a plane (rather than axially one behind another) in the main connector or in the mating connector, the latching principle described no longer functions. Accordingly, this principle is excluded from the following considerations.

A generic connector assembly is known from EP 2 822 106 A1.

The object of the invention is the provision of a connector assembly, comprising a main connector and a mating connector that can be mated with the latter, so that the above-mentioned disadvantages are eliminated. Specifically, it is intended that, during the mating process, it is possible for the main connector to assume a desired positionally correct location relative to the mating connector, and the mating process is facilitated.

This object is fulfilled by the characteristics of patent claim 1.

According to the invention, it is provided that the two springs have different lengths. Fundamentally, the plug-in principle, which is known from EP 2 822 106 A1 and is based upon the spring and slot design described therein, is maintained, in order to permit the maintenance of the resulting advantageous functions thereof, specifically in an oblique mating process. In a mating process of this type, on the grounds of the different length of the two springs (that can also be described as guide webs), any obstruction or skewing during the insertion of the main connector into its mating connector, which is formed with the chamfer, is effectively prevented as only one of the two springs (namely, the longer spring) is initially compelled to engage in one of the two slots by the sliding motion along the chamfer of the mating connector, and only once the longer spring has been inserted into the slot to a certain distance is the second, namely the shorter spring, also compelled to engage in its corresponding slot by the chamfer. During the mating process, the two guide webs (springs) are thus forced to engage, in sequence, in their corresponding slots. One end of one spring is thus arranged in a first plane, and the end of the second spring is arranged in a plane that differs from the first plane, wherein the end of the main connector (more specifically, the end of its contact support), which also constitutes the plug-in face, lies in one plane. The first plane of one spring (the longer spring) can lie in the same plane in which the end of the contact support also lies, wherein the end of the further (shorter) spring then lies in a recessed plane. However, it is also conceivable that the end of the contact support lies in a first plane, the end of one spring lies in a recessed second plane that differs therefrom, and the end of the second spring lies in a third plane, which differs from the second plane and is further recessed in relation thereto. In the consideration of these planes, it is irrelevant where the two springs terminate in their further course, originating from their mutually offset ends in the region of the plug-in face of the contact support.

Further configurations of the invention, from which corresponding advantages proceed, are disclosed in the subclaims.

These further configurations that, per se, can be considered in isolation or employed in combination in the connector assembly according to the invention, are further represented in an exemplary manner and described in greater detail hereinafter with reference to an embodiment.

FIGS. 1 to 4 show, in a detailed representation, various views of a connector assembly 1. The connector assembly 1 comprises a main connector 2 and a mating connector 3 that can be mated with the latter. The main connector 2, by means of a cable outlet 4, is arranged on an unrepresented cable. In the same way, the mating connector 3, by means of a cable outlet 5, is arranged on a likewise unrepresented further cable. These two cable outlets 4, 5 are exemplary only. It is also conceivable that the main connector 2, by means of its cable outlet 4, is connected to the respective cable, whereas the mating connector 3 comprises no cable outlet but, for example, projects from a housing of a control device or similar.

In the embodiment represented in FIGS. 1 to 4, the main connector 2 and the mating connector 3 respectively comprise a housing (not identified by reference numbers), wherein a contact support 6 or 7 is arranged in the respective housing. The housing or the respective contact support 6, 7 of the main connector 2 and the mating connector 3 respectively accommodate at least one unrepresented contact partner, and preferably a plurality of contact partners. These respective contact partners can be arranged as required in the contact support 6, 7. However, it will only then be possible to execute the complete mating of the connector assembly 1 if the respectively respective contact partners of the main connector 2 and the mating connector 3 have been positioned in the correct location in relation to one another, such that the contact partners, by the further axial displacement of the main connector 2 in the direction of the mating connector 3, can then be brought into the contact position.

A further constituent of the connector assembly 1 is a spring and slot system. In this system, the main connector 2 comprises two springs 8 arranged in mutual opposition (projections in the form of guide webs that are longitudinally configured in the axial direction), and the mating connector 3 comprises two slots arranged in mutual opposition. The operating method of this spring and slot system will be further addressed hereinafter, in conjunction with the description of the mating process.

In FIGS. 1 to 4, it is further represented that the mating connector 3 comprises a known chamfer 10, which cooperates with the frontal region of the contact support 6, and specifically with the two springs 8 on the mating connector 3. On the contact support 6 of the main connector 2, by way of a latch, at least one latching hook 11, and preferably two latching hooks 11 arranged in mutual opposition are provided. The mating connector 3, in turn, comprises at least one recess 12, and preferably two recesses 12 arranged in mutual opposition, which cooperate with the at least one latching hook 11 on the main connector 2, where these have been mated to constitute the connector assembly 1. The main connector 2, in its contact support 6, further comprises an undercut 13, and preferably two undercuts 13 arranged in mutual opposition. The mating connector 3, at least preferably in the region of the chamfer 10, comprises at least one latching hook 14, and preferably two latching hooks 14 arranged in mutual opposition. The at least one latching hook 14 on the mating connector 3 cooperates with the at least one respective undercut 13 on the main connector 2, where these two elements have been mated to constitute the connector assembly 1.

Further constituent parts of the main connector 2 and the mating connector 3 are represented and described in conjunction with the further FIGS.

FIGS. 5 to 12 show the connector assembly 1 during the mating process. The mating process is represented, from the approach of the main connector 2 to the mating connector 3, through to the point at which the main connector 2, in the correct position and in a regulation manner, has been further positively inserted into the mating connector 3 by the cooperation of the spring and slot system, in combination with the chamfer 10.

Figure 5:
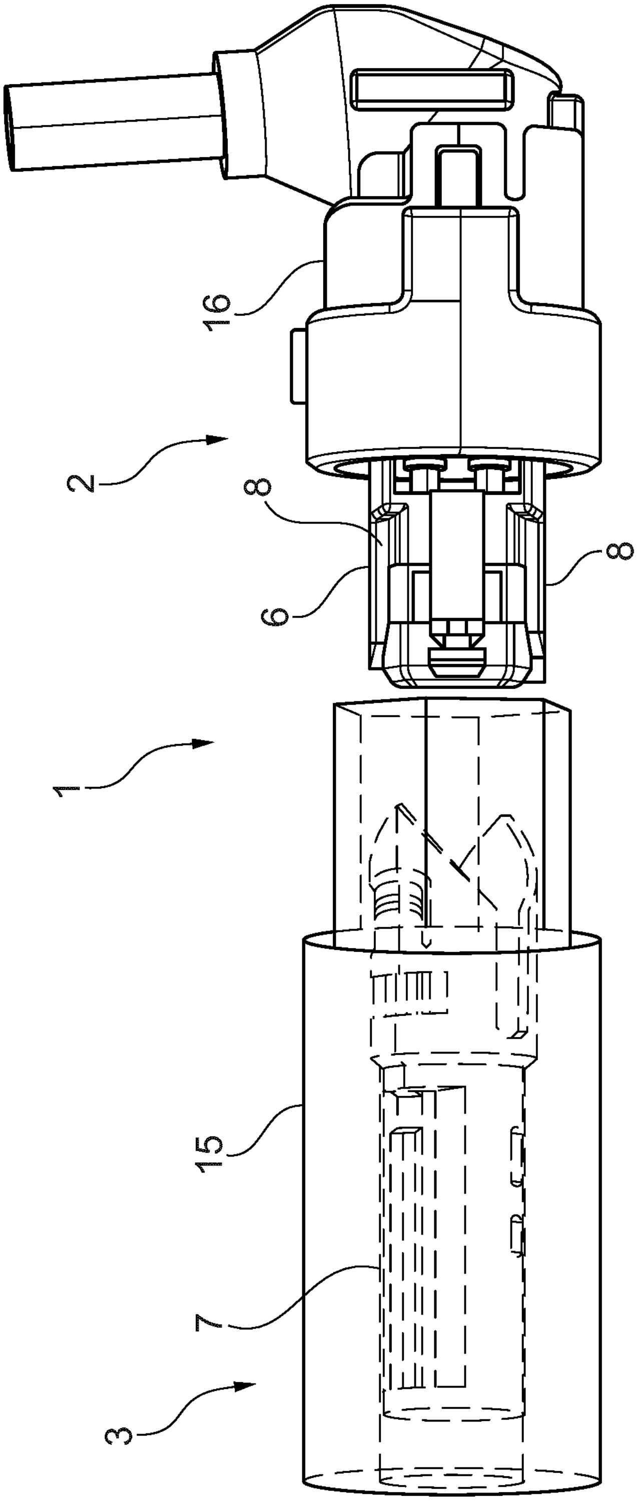
Figure 6:
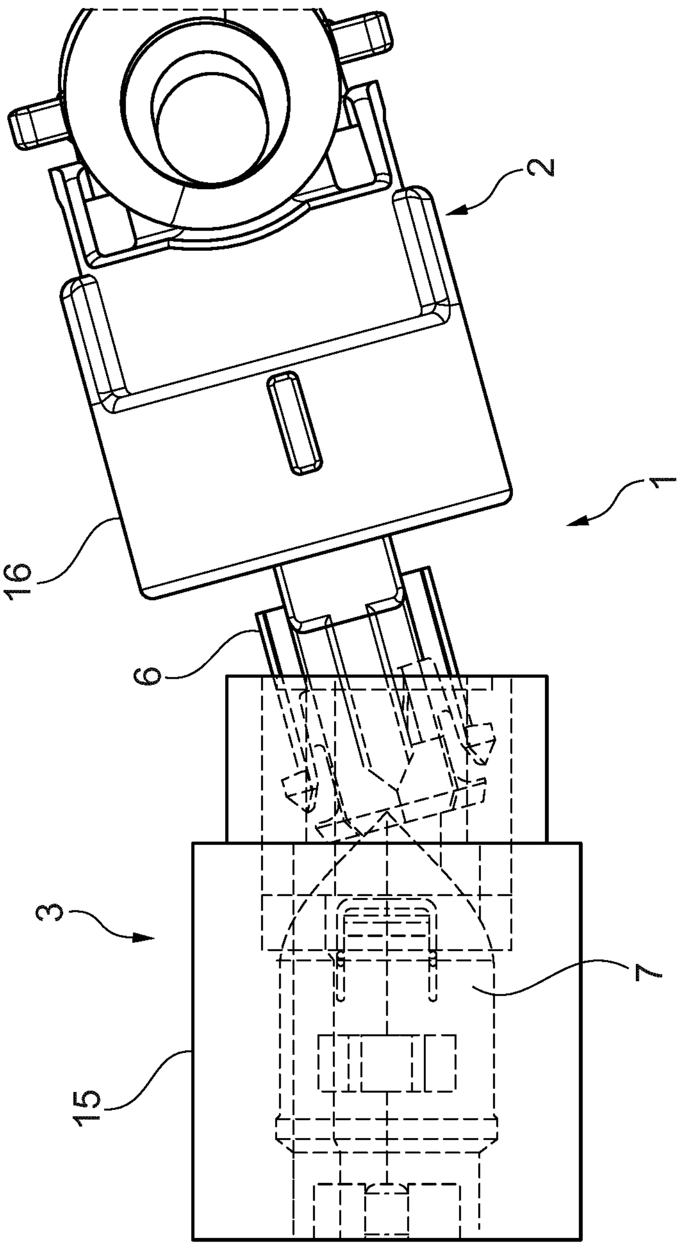
Figure 7:
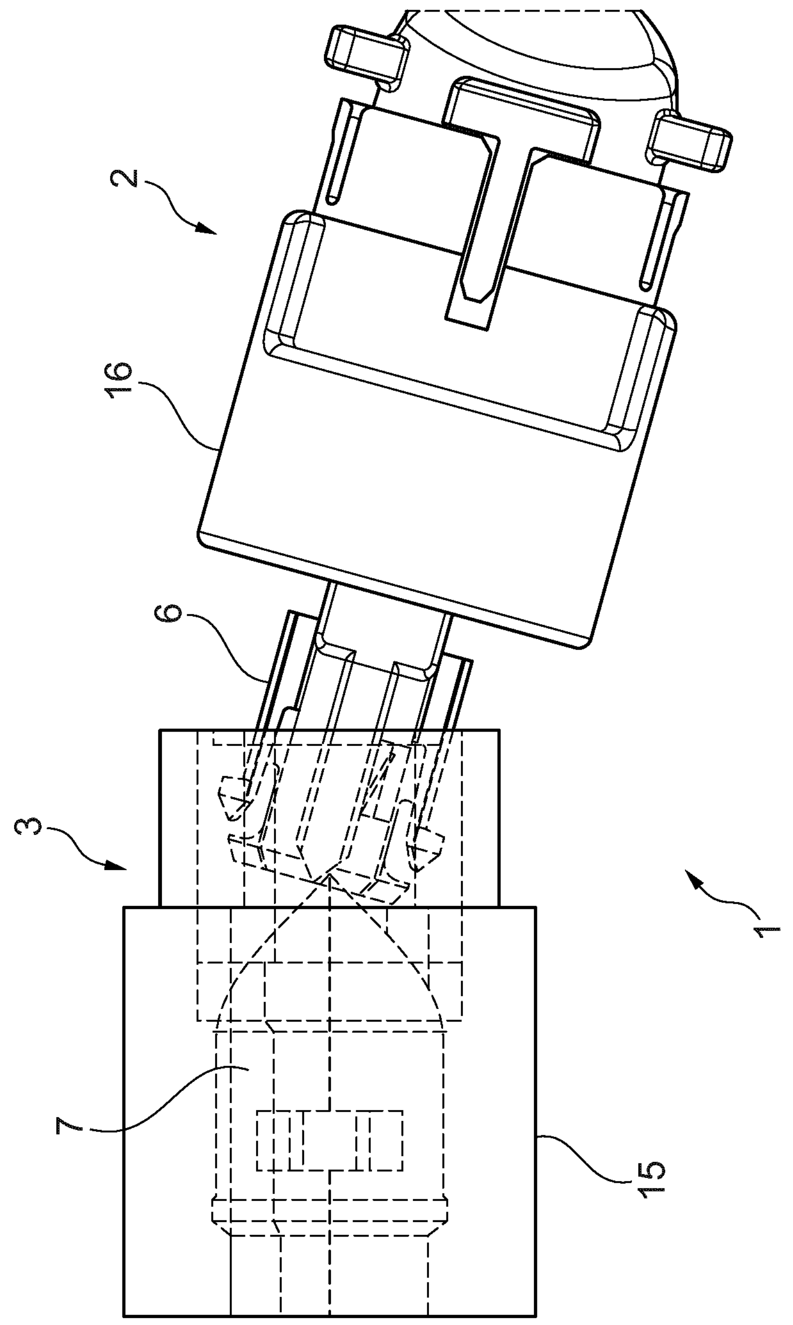
Figure 8:
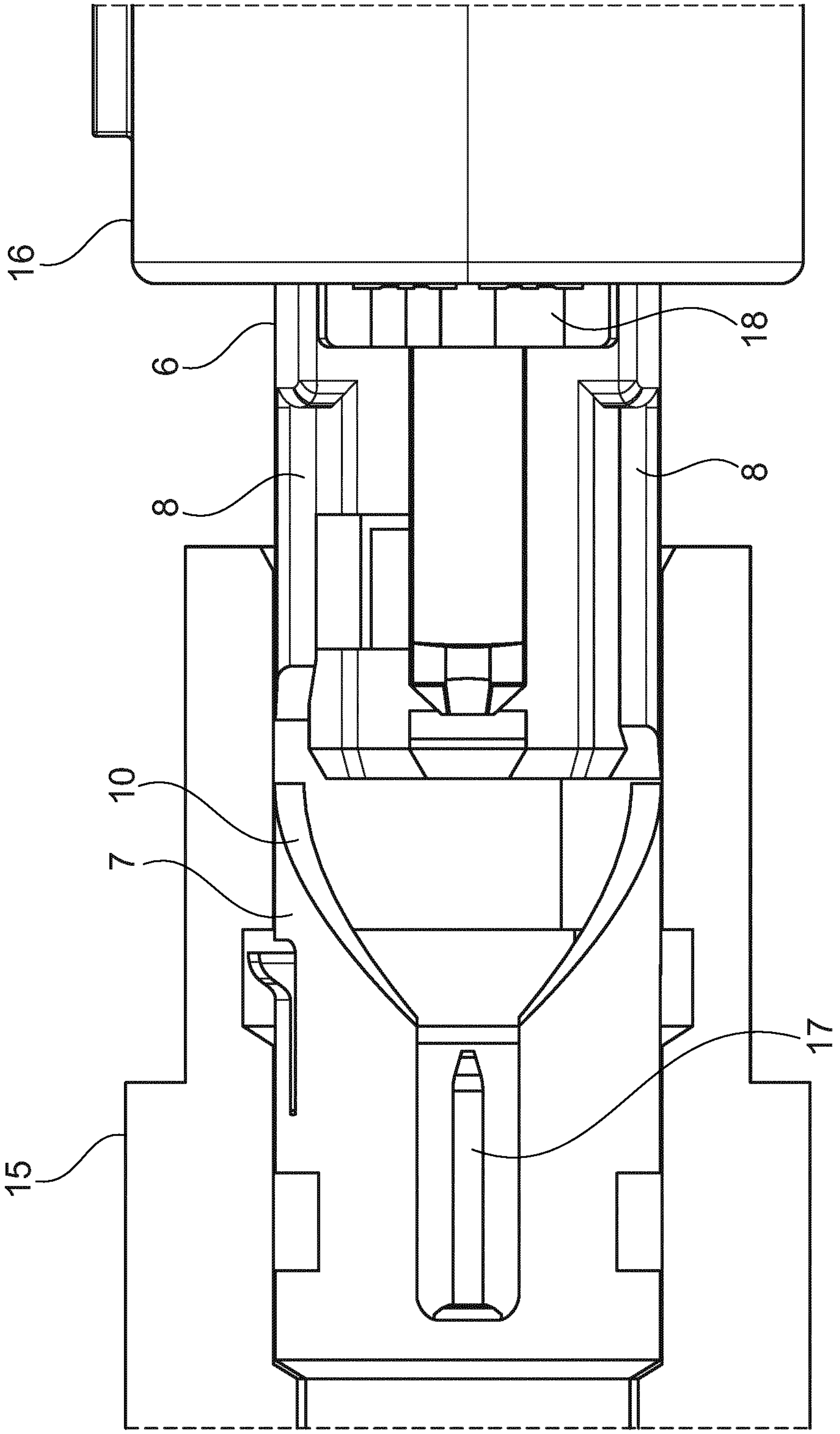
Figure 9:
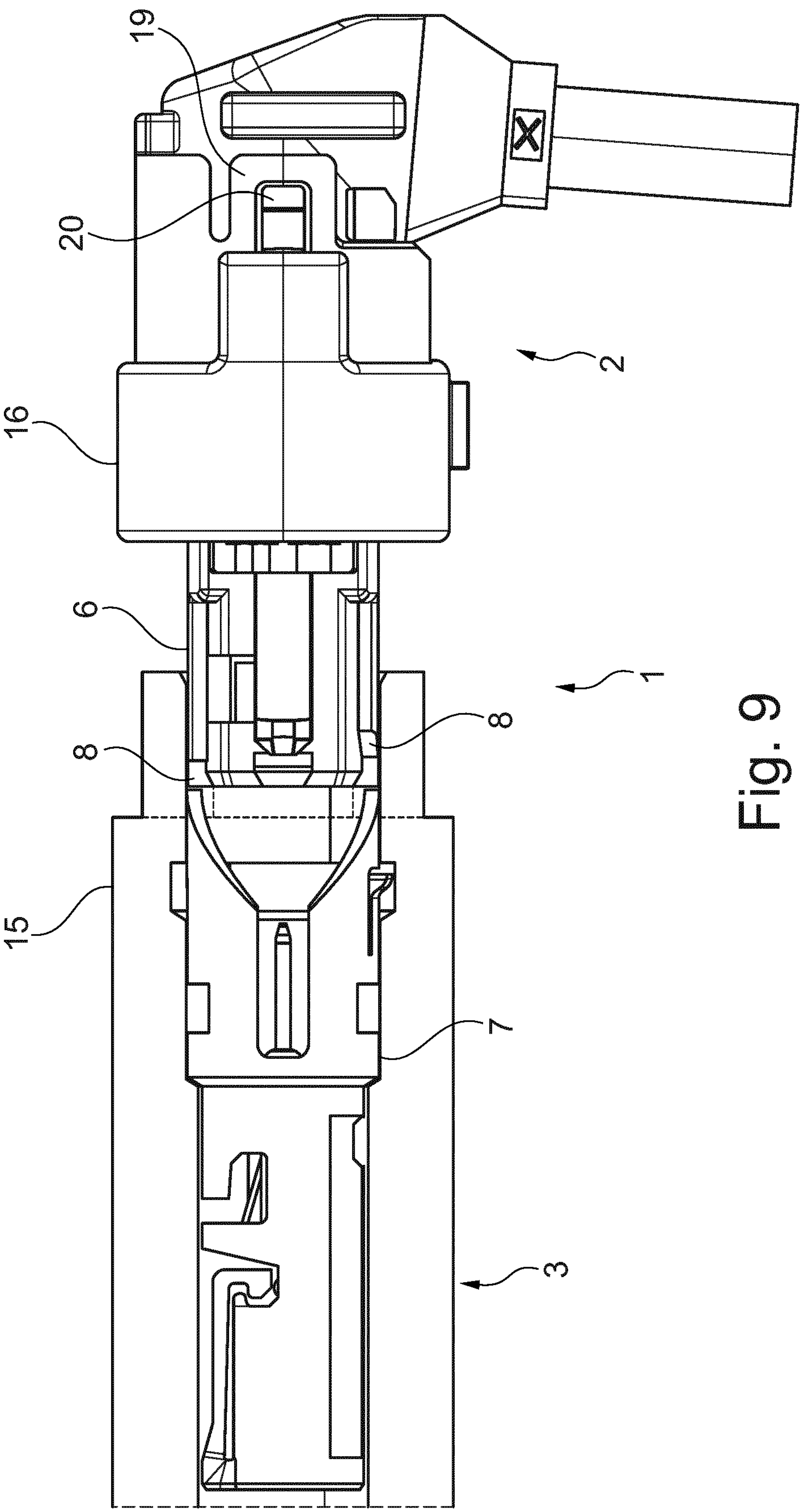
Figure 10:
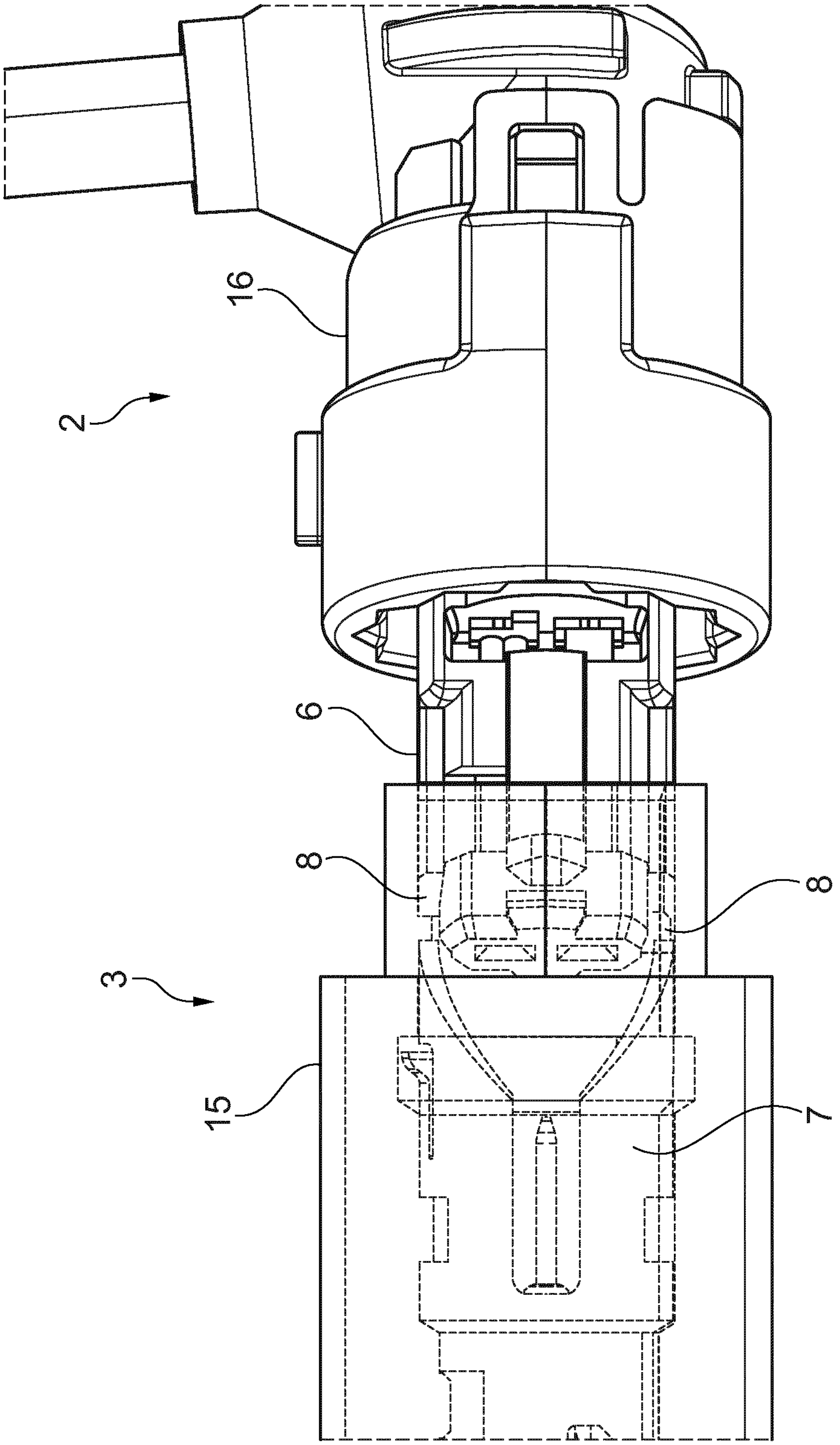

FIG. 5 shows the start of the mating process, after which the main connector 2 and the mating connector 3 have been brought closer to one another, and the mating face (the frontal region, averted from the cable outlet 4) of connector 2 has been brought into the plug-in region (averted from the cable outlet 5) of the mating connector 3. The chamfer 10 is located in the plug-in region of the mating connector 3. This chamfer 10 has an approximate V-shape. The V-shaped profile can be constituted by straight edges of the chamfer 10. In a particularly advantageous manner, the profile of the chamfer 10, from the start of the mating process and thereafter, has an approximately arched shape. As a result, upon the further insertion of the main connector 2 into the plug-in region of the mating connector 3, in the region of the chamfer, a positively directed insertion and mutual positioning is permitted. By means of this approximately arched profile of the lateral edges of the chamfer 10, firstly, the largest possible location region is provided on the mating face of the main connector 2 (i.e. in the region of the apexes of the chamfer 10 that are oriented in the direction of the mating connector 3), wherein, by means of the approximately arched profile, the location region of the chamfer 10 is enlarged, as the surface area is increased, and thus the targeted (positive) guidance delivered upon the further axial displacement of the main connector 2 in the direction of the mating connector 3 is enhanced within the region of the chamfer 10. In FIGS. 5 to 12, the start of the mating process of the main connector 2 in the region of the chamfer 10 of the mating connector 3 is represented accordingly. In this position, the unrepresented contact partners are still arranged with a spacing.

By means of the known spring and slot system, in cooperation with the chamfer 10, the main connector 2 can thus be brought initially into any desired position in the direction of the mating connector 3. By any desired position, it is to be understood that the contact partners of the main connector 2, in the axial direction, do not coincide with the corresponding contact partners of the mating connector 3. By this, it is also to be understood that, at the start of the mating process and during the further progress thereof, the main connector 2 and the mating connector 3 are not oriented in an axial line (in alignment), but obliquely to one another. This can be particularly clearly seen, for example, in FIGS. 5, 6 and 7. Here, it is represented that the main connector 2, prior to the start of the mating process, is oriented obliquely to the mating connector 3. Moreover, the two contact supports 6, 7 of the main connector 2 and the mating connector 3 are mutually rotated, such that not only are the (unrepresented) contact partners that are to be mutually connected not yet oriented in mutual alignment, but also the latching hooks 11 of the main connector 2 are not yet aligned with the recess 12 in the contact support 7 of the mating connector 3, and the spring 8 cannot yet be inserted in the respective slot 9. This is only possible once the main connector 2 is oriented in alignment with the mating connector 3, and is rotated. This correction of the position of the main connector 2 in relation to the mating connector 3 can then be seen in FIG. 12, such that it is possible for the mutual mating of the contact support 6 of the main connector 2 with the contact support 7 of the mating connector 3 to be executed, in the correct position, by means of an axial movement.

In FIGS. 5 to 12, moreover, further elements of the connector assembly 1 are represented, which may be present, but that are not required to be present.

In any event, contact partners 17, 18 are present, which are arranged in corresponding numbers, in their respective contact chambers, in the respective contact supports 6, 7 of the main connector 2 or the mating connector 3. This is shown, in a representative manner, in FIG. 8. Here, it can be seen that the at least one contact partner 17 (or a plurality of contact partners) is configured in the contact support 7 in the form of a contact pin. In consequence, the mating connector 3 is also described as a pin housing. The at least one corresponding contact partner 18 in the main connector 2 is then a contact socket, such that the main connector 2, in this case, can also be described as a coupling.

Further optional elements include an outer housing 15, which is arranged on the mating connector 3, and is specifically arranged for the variable positioning of the contact support 7 of the mating connector 3, for example by axial displacement. An outer shell 16 is arranged on the main connector 2, that encloses the contact support 6 of the main connector 2. The outer housing 15 and the outer shell 16 engage in mutual cooperation when the main connector 2 is mated with the mating connector 3.

The outer shell 16 is secured on the main connector 2, more specifically to the contact support 6 thereof, by a latch, and the outer housing 15 is likewise secured to the mating connector 3, more specifically to the contact support 7 thereof, by a latch. In this regard, reference may be made to FIG. 9, for representative purposes. The outer shell 16 on the main connector 2 comprises a tab 19 wherein, on the contact support 6 of the main connector 2, a projection that corresponds to the tab 19 is provided. The outer shell 16 can thus be push-fitted from the direction of the mating face of the contact support 6 (in the view shown in FIG. 9, the left-hand end of the contact support 6), such that the tab 19 is led over the projection 20 and thus, upon the completion of the movement, the outer shell 16 is secured to the contact support 6 by latching.

Figure 11:
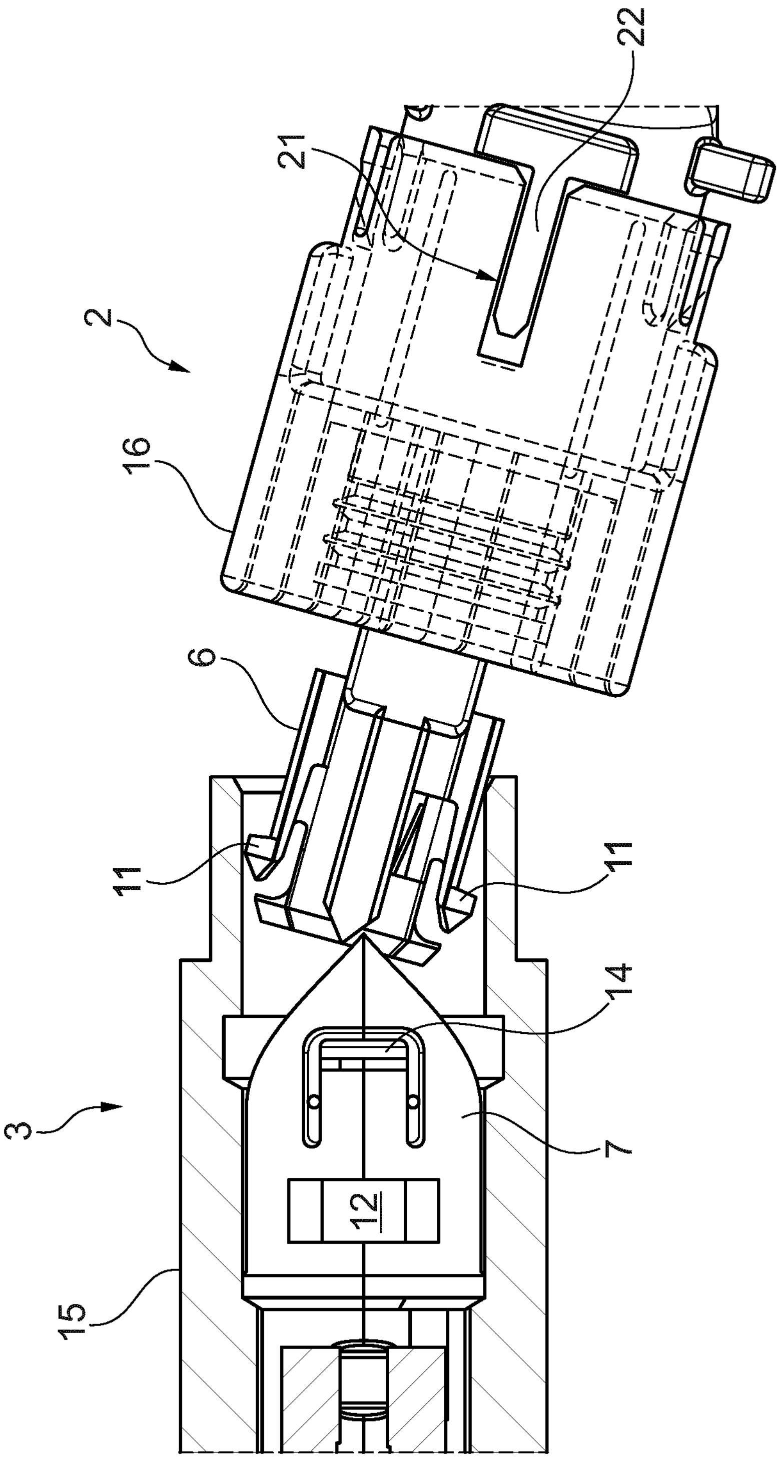
Figure 12:
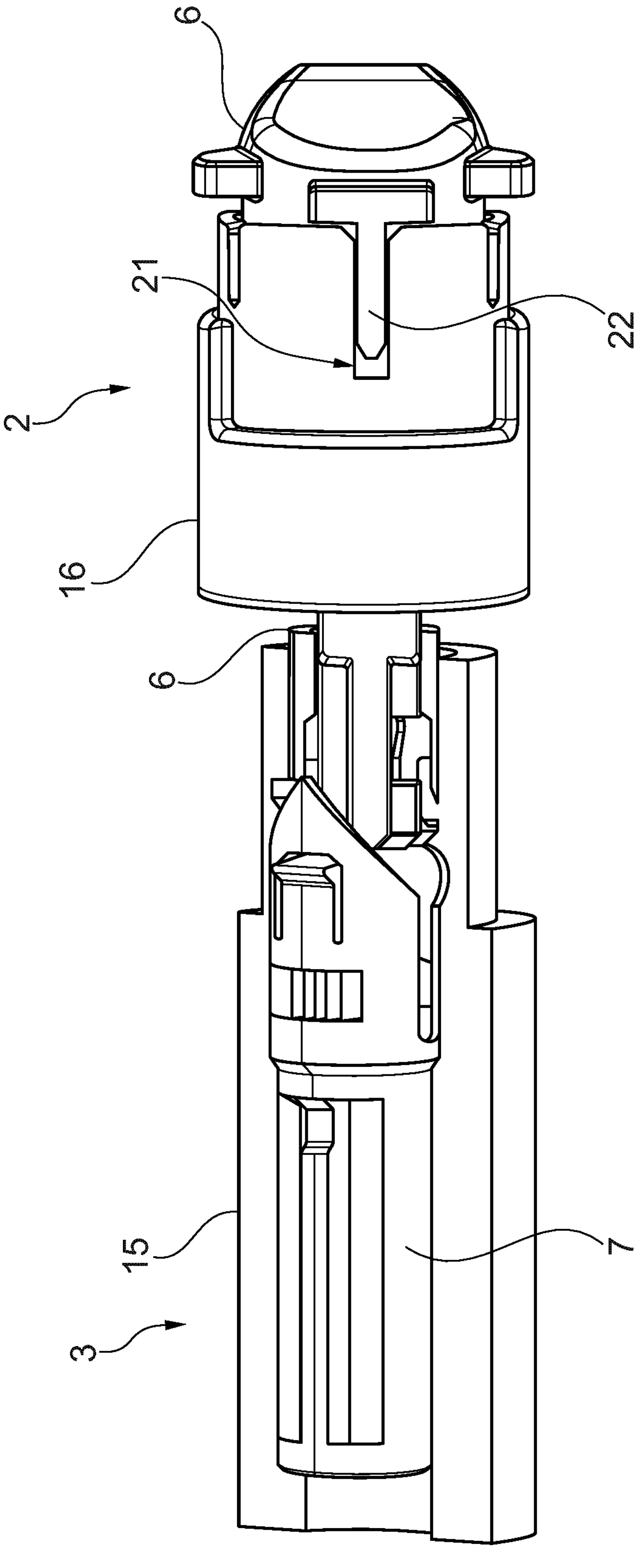

For the targeted guidance of the outer shell 16 during the mating process with the contact support 6, according to FIG. 11, the outer shell 16 comprises a longitudinal recess 21 and the contact support 6 comprises a corresponding and likewise longitudinal web 22. In the opening region, the recess 21 is slightly beveled, in order to permit the targeted insertion of the web 22. To this end, the lead-in region of the web 22 is also slightly beveled.

Preferably, the tab 19, the projection 20, the recess 21 and the web 22 are also provided in duplicate, in a mutually opposing arrangement.

At this point, it should be mentioned that the main connector 2 is configured as an angled connector wherein, however, a straight outlet of the cable is also conceivable. Likewise, for example, in consideration of FIG. 9, it is conceivable that the contact support is of one-piece construction, or is constituted of two or more than two parts. If the contact support 6 is constituted of two parts, for example, in consideration of FIG. 9, the left-hand part projects from the outer shell 16 and, in the same way, the second part projects from the outer shell 16 to the right, and forms the transition to the cable outlet 4. In this case, the connection plane is then arranged within the region of coverage of the outer shell 16.

Also provided, but not described in greater detail, are latches that can secure the outer housing 15 onto the respective contact support 7 of the mating connector 3, once the outer housing 15 has been push-fitted onto the contact support 7.

Figure 13:
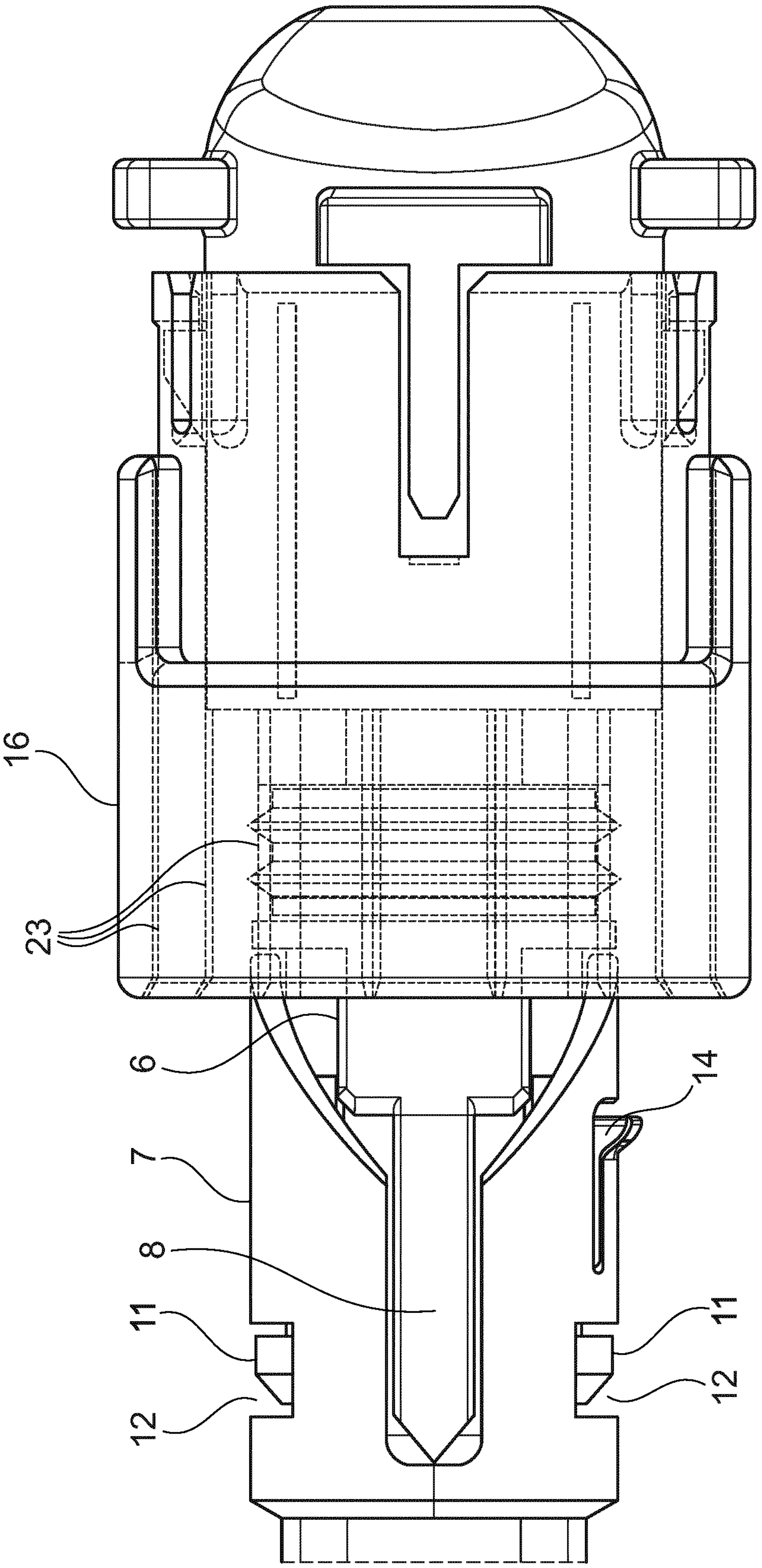

Finally, FIGS. 13 to 17 show the connector assembly 1 in the mated state, after the contact support 6 of the main connector 2 has been inserted into the contact support 7 of the mating connector 3, in the correct position. In FIG. 13 in particular, it can be seen that a first retention of the main connector 2 in its mating connector 3 is executed by the cooperation of the latching hook 11 with the recess 12. The same applies to the cooperation of the latching hook 14 with the undercut 13, forming a second retention of the main connector 2 in its mating connector 3. Optionally, only one of the two forms of retention described and illustrated can be considered.

Figure 16:
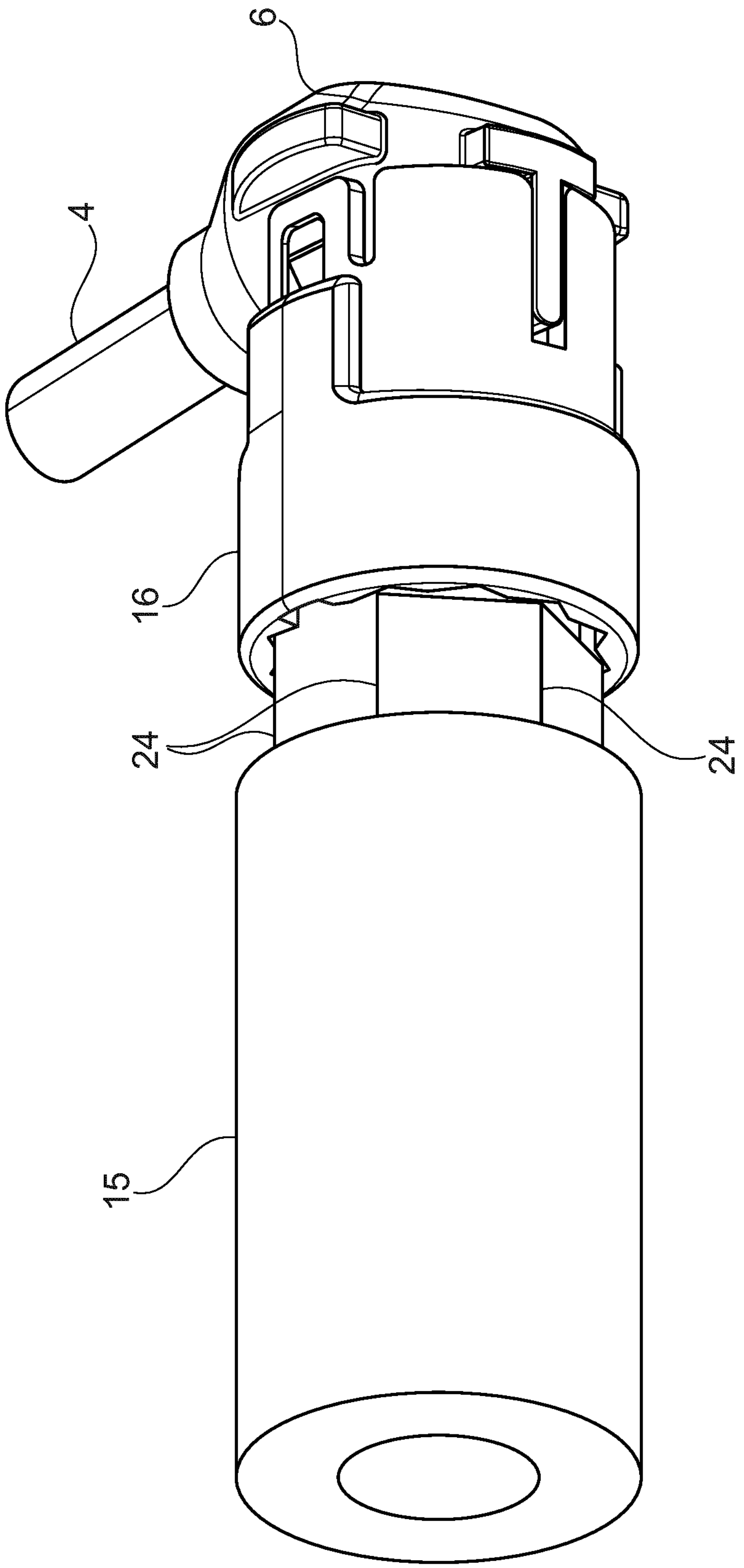

According to the invention, it is further provided that the outer shell 16 comprises internal teeth 23 and the outer housing 15 comprises external teeth 24 that mesh with the internal teeth 23. The internal teeth 23 of the outer shell 16 are, for example, represented in FIG. 13. Preferably, these internal teeth 23 have a 12-sided shape. This then cooperates with the external teeth 24 of the outer shell 15, in order to secure the main connector 2 against rotation in its mating connector 3, wherein the external teeth 24 are preferably configured with a 6-sided shape. This is represented in FIG. 16.

Once the mating process, which is represented and described in FIGS. 5 to 12, is completed, according to FIG. 13, the contact support 6 of the main connector 2 will be in the correct position and arranged, in a regulation manner, in the respective contact support 7 of the mating connector 3. In principle, the mating process is thus completed.

Figure 14:
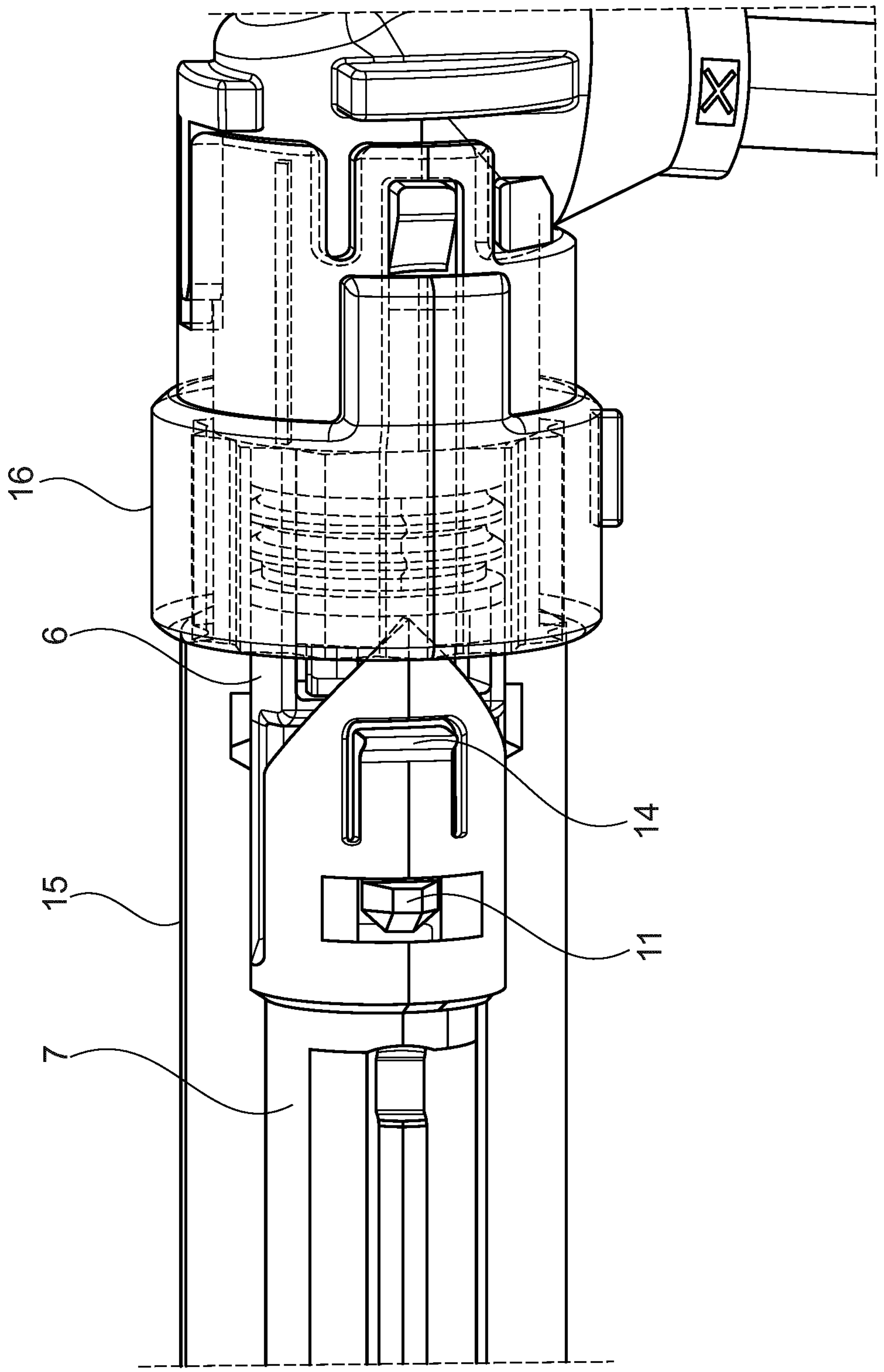
Figure 15:
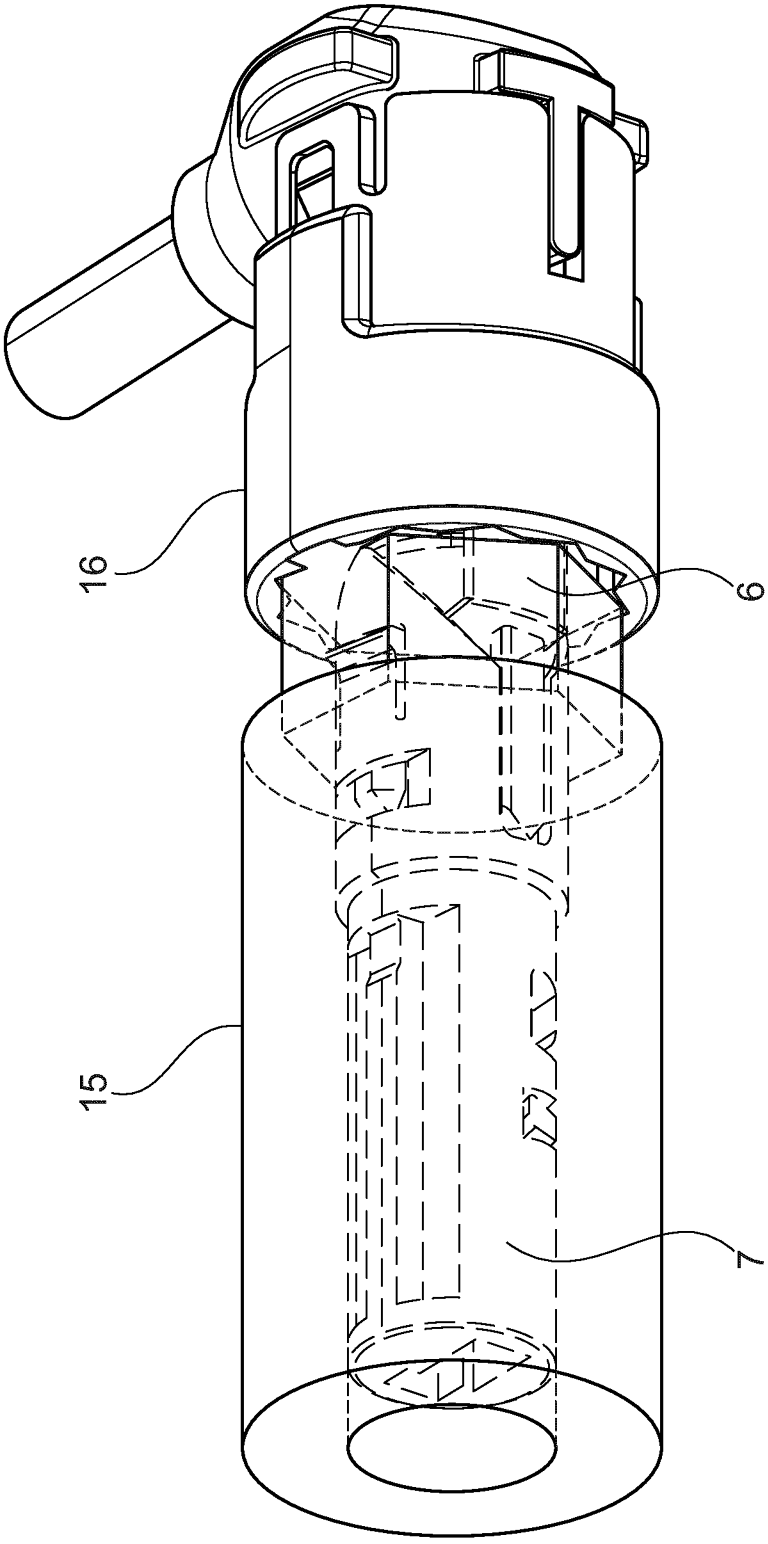
Figure 17:
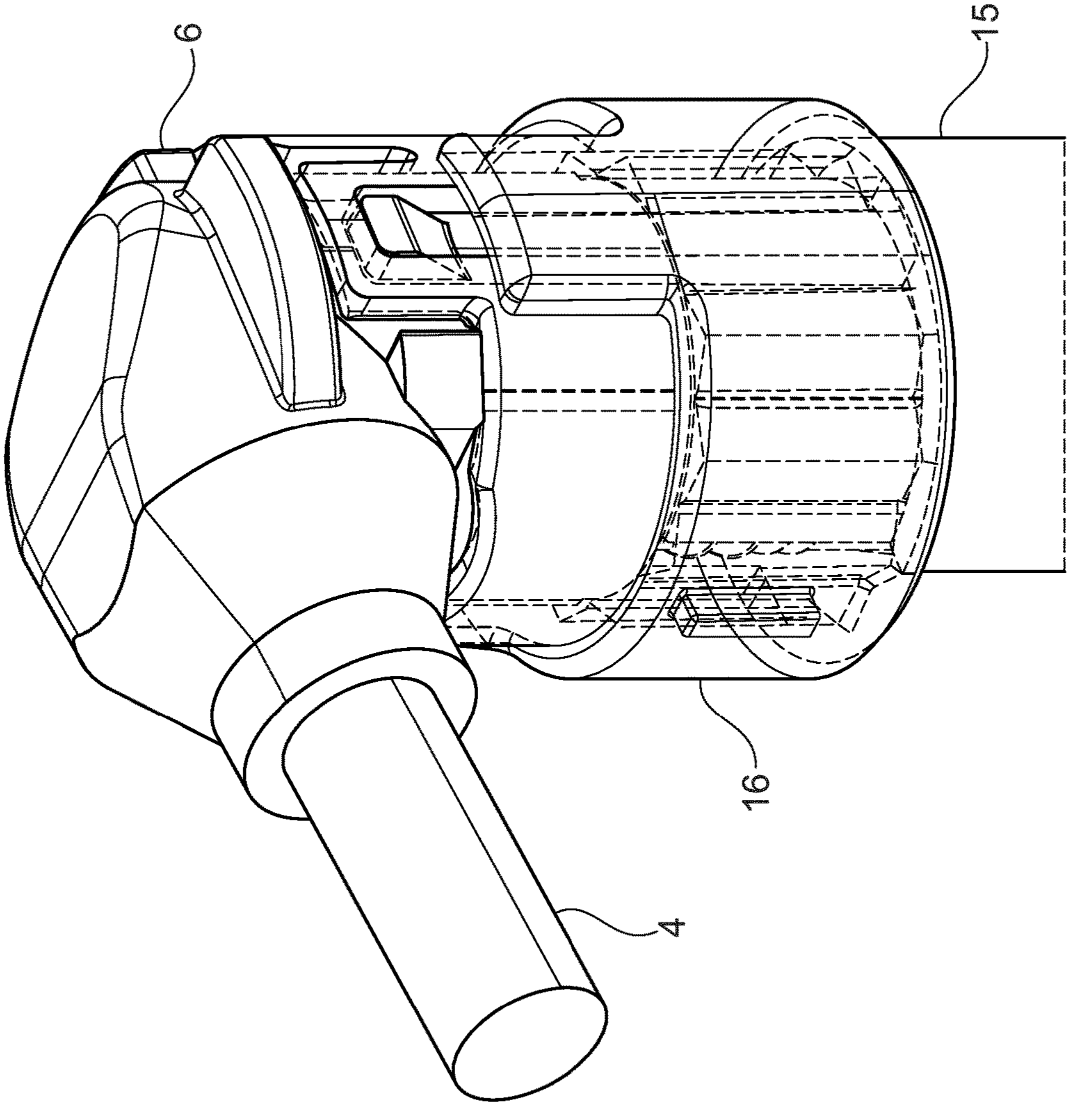

The presence of the outer shell 16 represented in FIG. 13 is not necessary for this purpose. If it is present, however, the outer housing 15 of the mating connector 3 must also be present. This is represented in FIGS. 15 and 16. Here, however, the outer housing 15 is arranged in a first position on the contact support 7, and is not yet secured, i.e. it can still be axially displaced. This can be seen in that, in FIGS. 15 and 16, the end face of the outer housing 15, which faces in the direction of the outer shell 16 and that can (but does not necessarily) incorporate the external teeth 24, is not yet inserted in the outer shell 16. This is only achieved after the completion of the mating process of the main connector 2 and the mating connector 3, in that the outer housing 15 is axially displaced in the direction of the outer shell 16, and is inserted therein to a certain extent. If the internal teeth 23 and the external teeth 24 are present, an anti-rotation function between the main connector 2 and the mating connector 3 is achieved as a result. This anti-rotation function is not delivered until not only the internal teeth 23, together with the external teeth 24, are inserted by the insertion of the front part of the outer housing 15 into the outer shell 16, but also, further to the completion of the axial displacement of the outer housing 15 onto its contact support 17, the outer housing 15 is permanently secured on the contact support 7, for example by a latching connection. The action of this permanent attachment, in addition to the axial attachment, must be such that the outer housing 15 can no longer be rotated about the contact support 7. This final state is represented in FIGS. 14 and 17.

If the internal teeth 23 and the external teeth 24 are not present, and the outer housing 15 is inserted concentrically in the outer shell 16, protection of the connector assembly 1 is provided, particularly in the contact region of the contact partners 17, 18, against external influences, particularly mechanical influences. Optionally, for the purposes of sealing against moisture, fluid or similar, the arrangement of a seal between the outer housing 15 and the outer shell 16 can be considered.

The invention is described again briefly hereinafter, using alternative terms.

The invention relates to a plug-in connection (connector assembly), comprising a pin housing (mating connector) and a coupling (connector) wherein, further to the completion of the plugging of the pin housing and the coupling into the connecting rod of the mating connector, by means of the external 6-sided shape of the connecting rod, which engages with the internal 12-sided shape of the latching shell, an anti-rotation function is provided, wherein the pin housing latches into the connecting rod by the engagement of a hook in a circumferential slot, and the coupling latches into the pin housing by means of two latching hooks, such that the coupling can only be plugged into the connecting rod if the pin housing is fully latched in the connecting rod, as the displaced hook would otherwise constitute an obstruction plugging in, wherein the two guide webs on the coupling have different lengths, as a result of which any blocking of the pin housing that rotates in the coupling rod is not possible, even in the event of oblique plugging-in, if both webs engage on the same side.

Summary of technical characteristics:

1.) Further to the completion of the plugging of the pin housing and the coupling into the connecting rod, the main connector is secured against rotation by the external 6-sided shape of the connecting rod, which engages with an internal 12-sided shape of the latching shell. The main connector would otherwise be rotatable on the connecting rod (the latching slot of the pin housing is configured circumferentially in the connecting rod).

2.) The pin housing latches into the connecting rod by the engagement of a hook in a circumferential slot, and the coupling latches into the pin housing by means of two latching hooks.

3.) The coupling can only be plugged into the connecting rod if the pin housing is fully latched in the connecting rod. The displaced hook would otherwise constitute an obstruction to plugging-in.

4.) The two guide webs on the coupling have different lengths. Any blocking of the pin housing that rotates in the connecting rod is thus not possible, even in the event of oblique plugging-in (if both webs engage on the same side).

In consideration of the embodiment, the main connector 2 thus constitutes the above-mentioned coupling. The outer shell 16 is the above-mentioned latching shell with an internal 12-sided shape. The mating connector 3 constitutes the pin housing, wherein the outer housing 15 is the above-mentioned connecting rod with an external 6-sided shape.

The invention is preferably employed in the automotive sector. On the grounds of the limited space available, problems are frequently encountered in vehicles, not only with respect to the accommodation of connector assemblies per se, but also with respect to the observation of the correct laying of cables and the achievement of the stipulated routing thereof. At the same time, it is intended that the fitting of cables with connectors, potentially including the fitting of connectors to a plurality of cables on complex cable harnesses, should be simple, rapid and positionally correct. The connector assembly according to the invention, and the manner of the mating process, provide the advantage that the main connector and the mating connector, even in a confined space, can be brought together as required, and the actual mating process is only completed thereafter, in a targeted manner.

LIST OF REFERENCE NUMBERS

1. Connector assembly
2. Connector
3. Mating connector
4. Cable outlet
5. Cable outlet
6. Contact support
7. Contact support
8. Spring
9. Slot
10. Chamfer
11. Latching hook
12. Recess
13. Undercut
14. Latching hook
15. Outer housing
16. Outer shell
17. Contact partner
18. Contact partner
19. Tab
20. Projection
21. Recess
22. Web
23. Internal teeth
24. External teeth

The invention claimed is:

1. A connector assembly comprising:

a main connector with a contact support, and a mating connector that can be mated with the main connector and that has a contact support, wherein the mating connector is formed in a plug-in region with a chamfer that corresponds to the shape of the main connector such that, during the mating process, the main connector is inserted into the mating connector in a predefined position, wherein the main connector comprises two axially extending springs, arranged in opposition in the plug-in direction, and the mating connector comprises two opposing slots, or vice versa, wherein a spring corresponds to its respective slot, wherein the two springs have different lengths.

2. The connector assembly according to claim 1, wherein the chamfer has an approximate V-shape.

3. The connector assembly according to claim 1, wherein the profile of the chamfer, from the start of the mating process and thereafter, has an approximately arched shape.

4. The connector assembly according to claim 3, wherein the slot commences at the end of the chamfer, considered in the plug-in direction.

5. The connector assembly according to claim 1, wherein the plug-in region of the main connector is configured such that the main connector is still rotatable about its longitudinal axis relative to the mating connector until it is located in the region of the chamfer of the mating connector, and the main connector and the mating connector are then only axially moveable, but are no longer rotatable relative to one another, once the main connector has been moved beyond the region of the chamfer further into the mating connector.

6. The connector assembly according to claim 1, wherein the main connector comprises an outer shell and the mating connector comprises an outer housing that is operatively connectable with the outer shell.

7. The connector assembly according to claim 6, wherein the outer shell is secured on the main connector by a latch, and the outer housing is also secured on the mating connector by a latch.

8. The connector assembly according to claim 6, wherein the outer shell comprises internal teeth and the outer housing comprises external teeth that fit with the internal teeth.

* * * * *